United States Patent

(12) United States Patent
Connors et al.

(10) Patent No.: US 9,072,214 B2
(45) Date of Patent: Jul. 7, 2015

(54) STEERABLE AGRICULTURAL IMPLEMENT WITH ADAPTABLE WHEEL SPACING

(75) Inventors: Michael J. Connors, Lockport, IL (US); Brian Anderson, Yorkville, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 956 days.

(21) Appl. No.: 12/608,375

(22) Filed: Oct. 29, 2009

(65) Prior Publication Data

US 2011/0100656 A1 May 5, 2011

(51) Int. Cl.
*A01B 63/16* (2006.01)
*A01B 63/00* (2006.01)
*A01B 73/00* (2006.01)

(52) U.S. Cl.
CPC .............. *A01B 63/16* (2013.01); *A01B 63/006* (2013.01); *A01B 73/00* (2013.01)

(58) Field of Classification Search
CPC ....... A01B 63/16; A01B 63/006; A01B 73/00
USPC ......... 172/278, 280, 282, 286, 287, 290, 383, 172/400, 401
See application file for complete search history.

(56) References Cited

U.S. PATENT DOCUMENTS

| 2,174,493 | A | | 9/1939 | Vanderwerf | |
| 2,370,468 | A | * | 2/1945 | Hyland | 172/282 |
| 2,599,065 | A | * | 6/1952 | Newkirk | 172/255 |
| 3,212,793 | A | | 10/1965 | Pietroroia | |
| 3,229,986 | A | | 1/1966 | Ferris | |
| 3,291,503 | A | | 12/1966 | De Lay | |
| 3,454,285 | A | | 7/1969 | Peursem | |
| 3,648,780 | A | * | 3/1972 | Fueslein et al. | 172/319 |
| 3,703,932 | A | | 11/1972 | Tuttle et al. | |
| 4,219,208 | A | * | 8/1980 | Fuller et al. | 280/89.12 |
| 4,272,097 | A | * | 6/1981 | Cornelius | 172/311 |
| 4,451,052 | A | * | 5/1984 | Gagelin | 280/43.23 |
| 4,496,004 | A | * | 1/1985 | Frase et al. | 172/311 |
| 4,552,375 | A | | 11/1985 | Kinzenbaw | |
| 4,579,362 | A | * | 4/1986 | Kirkpatrick | 280/444 |
| 5,024,279 | A | * | 6/1991 | Warner et al. | 172/1 |
| 5,135,056 | A | * | 8/1992 | Sartor | 172/221 |
| 5,244,226 | A | | 9/1993 | Bergh | |
| 5,261,497 | A | | 11/1993 | Snyder et al. | |
| 5,340,142 | A | * | 8/1994 | Kuhns | 280/444 |
| 5,409,069 | A | * | 4/1995 | Hake | 172/400 |
| 5,488,996 | A | * | 2/1996 | Barry et al. | 172/311 |
| 6,158,759 | A | * | 12/2000 | Perry | 280/444 |

(Continued)

FOREIGN PATENT DOCUMENTS

EP 0653343 5/1995

*Primary Examiner* — Jamie L McGowan
(74) *Attorney, Agent, or Firm* — Rebecca L. Henkel

(57) ABSTRACT

An agricultural implement is provided that includes a hitch assembly configured to couple the agricultural implement to a tow vehicle. The agricultural implement also includes a carrier frame pivotally coupled to the hitch assembly by a main pivot joint such that the main pivot joint resists substantially all lateral loads between the carrier frame and the hitch assembly. The agricultural implement further includes a pair of wheel assemblies each rotatably coupled to the carrier frame by a respective knuckle pivot joint, and an actuator assembly configured to rotate each wheel assembly about the respective knuckle pivot joint while the agricultural implement is in both a working and transport position.

19 Claims, 8 Drawing Sheets

(56) References Cited

U.S. PATENT DOCUMENTS

| | | |
|---|---|---|
| 6,290,248 B1 | 9/2001 | Yrigoyen |
| 6,397,953 B1* | 6/2002 | Ankenman ............... 172/445.1 |
| 6,443,079 B1 | 9/2002 | Horsch |
| 6,883,821 B2* | 4/2005 | Gunderson .................. 280/442 |
| 7,310,929 B2 | 12/2007 | Dow et al. |
| 2007/0145714 A1* | 6/2007 | Friggstad .................... 280/444 |
| 2007/0163791 A1* | 7/2007 | Meek ........................... 172/311 |
| 2009/0184491 A1 | 7/2009 | Neudorf et al. |
| 2009/0272551 A1 | 11/2009 | Thompson et al. |
| 2009/0273160 A1 | 11/2009 | Friggstad et al. |

* cited by examiner

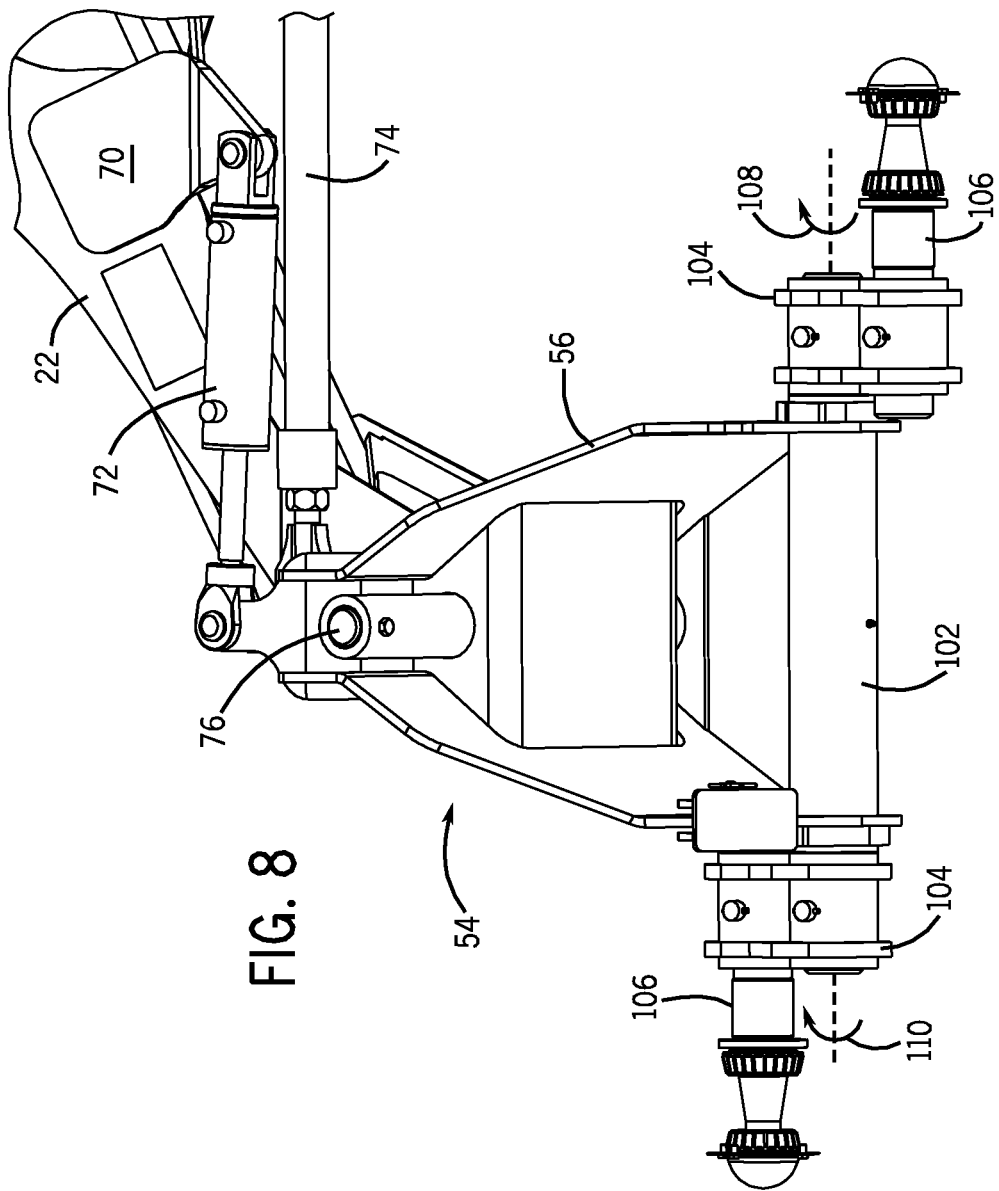

STEERABLE AGRICULTURAL IMPLEMENT WITH ADAPTABLE WHEEL SPACING

BACKGROUND

The invention relates generally to a steerable agricultural implement with adaptable wheel spacing.

A wide range of farm implements have been developed and are presently in use for tilling, planting, harvesting, and so forth. Seeders or planters, for example, are commonly towed behind tractors and may cover wide swaths of ground which may be tilled or untilled. Such devices typically open the soil, dispense seeds in the opening, and close the soil in a single operation. Seeds are commonly dispensed from seed tanks and distributed to row units by a distribution system. To make the seeding operation as efficient as possible, very wide swaths may be covered by extending wings on either side of a central section of the implement pulled by the tractor. Included in the wing assemblies are tool bars, row units mounted thereon, and support wheels. The wings and row units are commonly disposed in a "floating" arrangement during the planting operation, wherein hydraulic cylinders allow the implement to contact the soil with sufficient force to open the soil, dispense the seeds and close the soil. For transport, the wings may be elevated and folded forward to reduce the width of the implement.

Certain implements include steerable wheels configured to decrease a turning radius of the implement while in a transport position. As will be appreciated, steering the implement will induce a significant lateral force between the assembly supporting the wheels and the body of the implement. Consequently, certain implements employ a linkage positioned between wheel assemblies to resist the lateral loads. While the linkage may provide lateral stability, the additional structure raises implement weight and increases construction costs. Furthermore, because the linkage is positioned between the wheel assemblies, the spacing between wheel assemblies, wheel width, and/or wheel rotation angle may be limited.

BRIEF DESCRIPTION

The present invention provides a steerable agricultural implement with adaptable wheel spacing. In an exemplary embodiment, the agricultural implement includes a hitch assembly configured to couple the agricultural implement to a tow vehicle. The agricultural implement also includes a carrier frame pivotally coupled to the hitch assembly by a main pivot joint such that the main pivot joint resists substantially all lateral loads between the carrier frame and the hitch assembly. The agricultural implement further includes a pair of wheel assemblies each rotatably coupled to the carrier frame by a respective knuckle pivot joint, and an actuator assembly configured to rotate each wheel assembly about the respective knuckle pivot joint. In this configuration, no structural elements of the carrier frame or the hitch assembly are positioned between the wheel assemblies, thereby enabling the wheel assemblies to be positioned closer together to accommodate a larger variety of row spacings.

DRAWINGS

These and other features, aspects, and advantages of the present invention will become better understood when the following detailed description is read with reference to the accompanying drawings in which like characters represent like parts throughout the drawings, wherein:

FIG. 8 is a top view of a wheel assembly, illustrating a wheel rocking mechanism.

DETAILED DESCRIPTION

Figure 1:
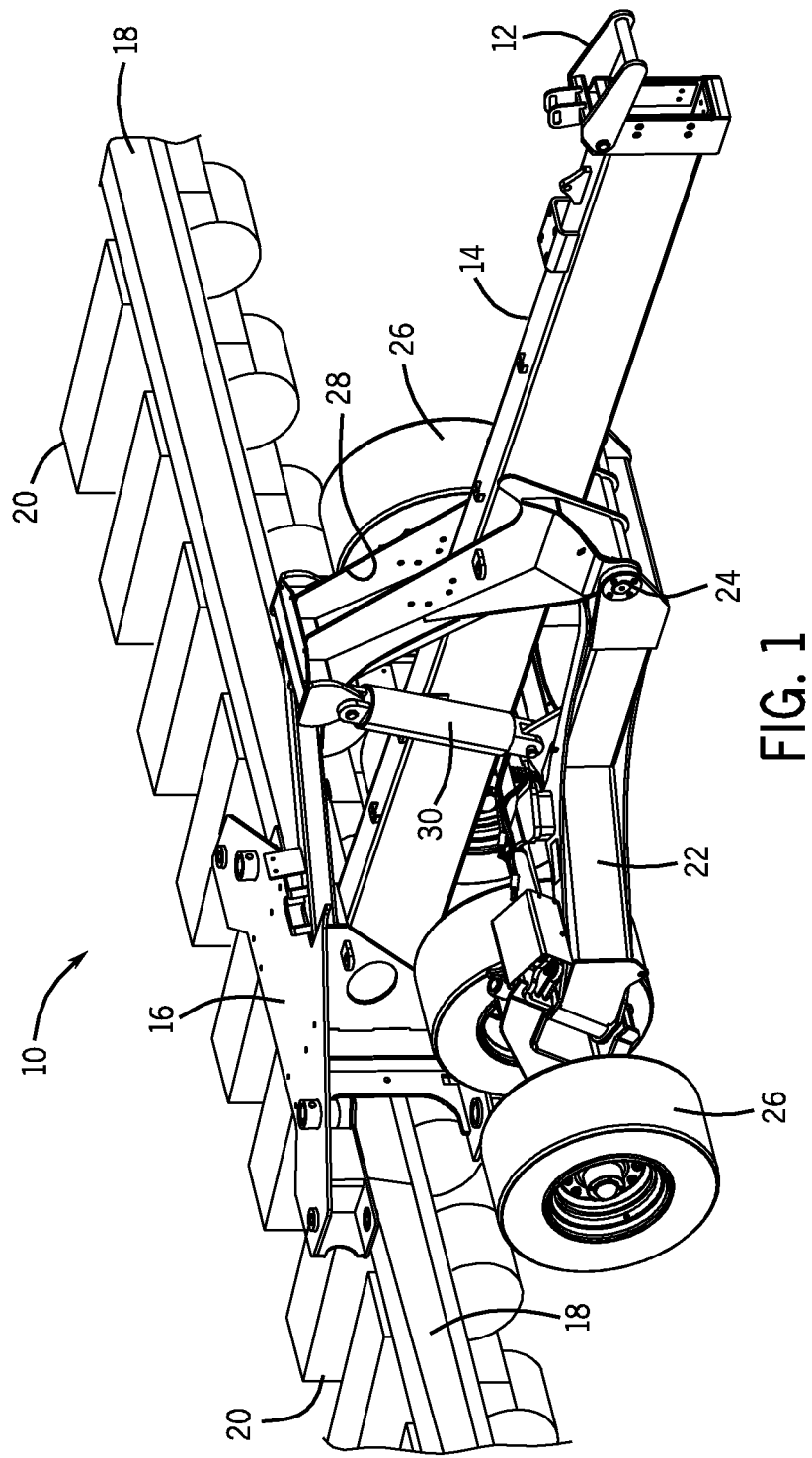
FIG. 1 is a perspective view of an agricultural implement in a working position, including a carrier frame coupled to a hitch assembly by a single main pivot joint and a pair of main lift cylinders.

Turning now to the drawings, FIG. 1 is a perspective view of an agricultural implement 10 in a working position. The implement 10 is designed to be towed behind a prime mover such as a tractor. The implement includes a tow hitch 12 which is coupled to a hitch assembly 14. The tow hitch 12 may be used to attach the implement 10 to a tractor and may be pivotally coupled to the hitch assembly 14 to facilitate flexibility as the implement changes elevation as it is towed across a field. A toolbar mounting structure 16 is coupled to the hitch assembly 14, and configured to pivotally secure toolbars 18. In the illustrated working position, the toolbars extend laterally outwardly from the mounting structure 16. Multiple row units 20, configured to deposit seeds and/or fertilizer into soil, are coupled to the toolbars 18. In the present embodiment, the toolbars 18 are configured to fold forward when the implement 10 is in a transport position. When in the transport position, the toolbars 18 are generally parallel to the hitch assembly 14. Furthermore, as discussed in detail below, the row units 20 are raised above the ground while the implement 10 is in the transport position.

As illustrated, a carrier frame 22 is rotatably coupled to the hitch assembly 14 by a single main pivot joint 24. Ground engaging wheels 26 are coupled to the carrier frame 22 to support the weight of the implement 10 during both operation and transport. In addition, a support frame 28 is coupled to the hitch assembly 14, and configured to support the carrier frame 22. Specifically, main lift cylinders 30 extend between the support frame 28 and the carrier frame 22. In the illustrated working position, the main lift cylinders 30 are in a retracted position such that the hitch assembly 14 is lowered relative to the carrier frame 22, thereby inducing the row units 20 to engage the soil. As discussed in detail below, the main lift cylinders 30 may extend to raise the row units 20 above the ground, thereby transitioning the implement into a transport position.

As discussed in detail below, the implement 10 includes an actuator assembly configured to steer the implement 10 in both the working and transport positions. As will be appreciated, steering the implement will induce a significant lateral force between the carrier frame 22 and the hitch assembly 14. In addition to the main pivot joint 24, certain implements include a secondary linkage configured to resist these lateral loads. Such secondary linkages are generally disposed at a rear portion of the carrier frame 22 between the wheel assemblies. While the secondary linkage provides lateral stability, the additional structure raises implement weight and increases construction costs. Furthermore, because the secondary linkage is disposed between the wheel assemblies, the spacing between wheel assemblies, wheel width, and/or wheel rotation angle may be limited.

Consequently, the present embodiments are configured to obviate the secondary linkage by providing a single pivot joint 24 configured to resist substantially all lateral loads. Without the secondary linkage, no structural elements of the carrier frame 22 or the hitch assembly 14 are disposed between the wheel assemblies. This configuration enables the wheel assemblies to be positioned closer together, thereby accommodating a larger variety of row spacings. In addition, the weight of the implement 10 and/or the implement construction cost may be reduced due to the decreased number of structural components. Furthermore, without the secondary linkage, wider wheels may be employed to accommodate the weight of heavier implements 10. Finally, because the carrier frame 22 is only attached to the hitch assembly 14 by the single main pivot joint 24 and the main lift cylinders 30, the carrier frame 22 may be easily removed and interchanged with carrier frames configured for different row spacings. This may facilitate rapid reconfiguration of the implement 10 for various crops.

Figure 2:
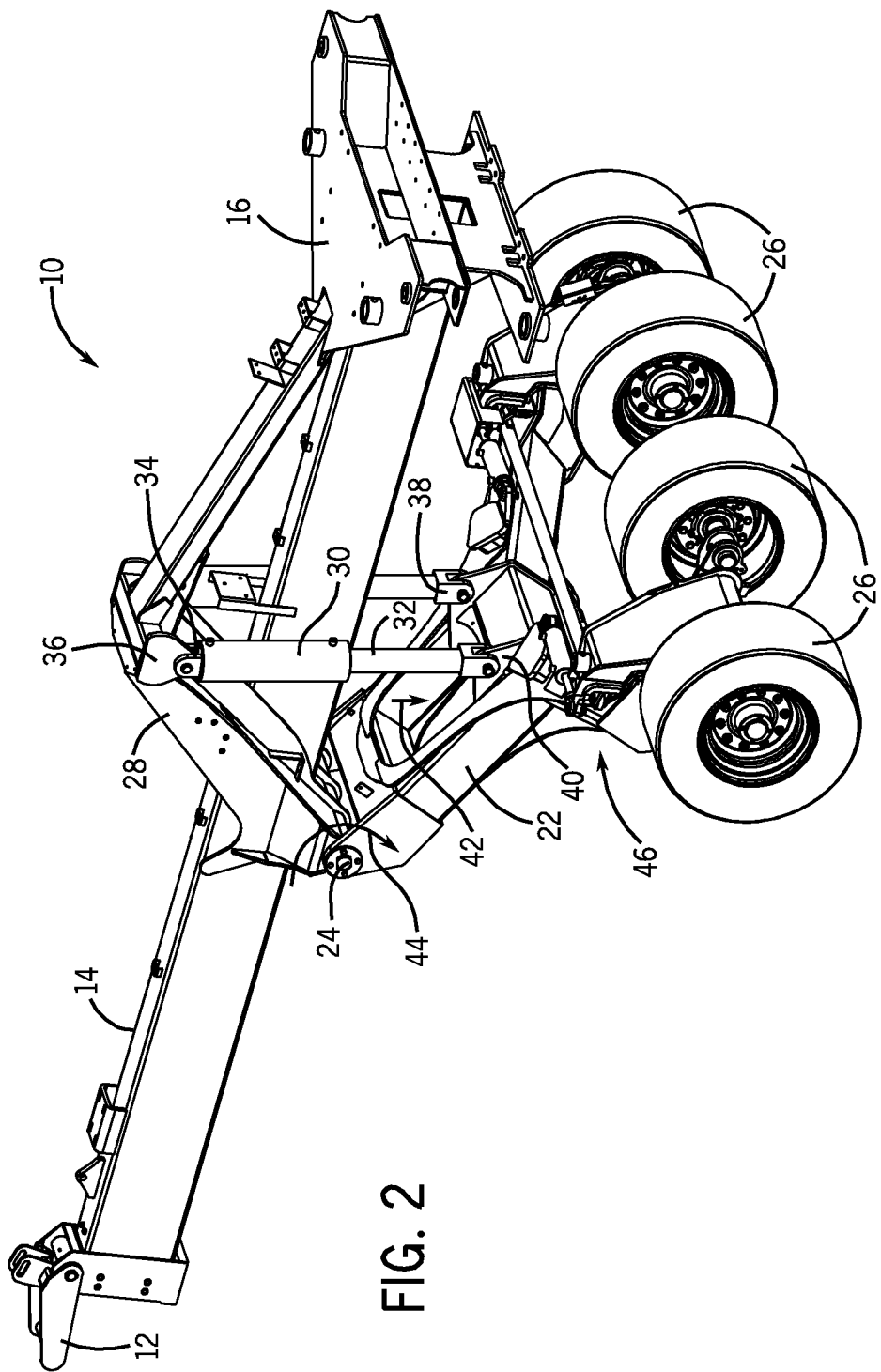
FIG. 2 is a perspective view of the agricultural implement, as shown in FIG. 1, in a transport position.

FIG. 2 is a perspective view of the agricultural implement 10 in a transport position. As illustrated, the main lift cylinders 30 are in an extended position to raise the hitch assembly 14 above the ground. In the present configuration, the main lift cylinders 30 are hydraulically operated and include a piston rod 32 which extends from the cylinder 30. A first clevis 34 of each main lift cylinder 30 is coupled to a respective tang 36 of the support frame 28. Similarly, a second clevis 38 is coupled to a tang 40 of the carrier frame 22. In the present configuration, both devises 34 and 38 are secured by pins to the respective tangs 36 and 40. As the rod 32 extends in the direction 42, the carrier frame 22 is driven to rotate in the direction 44 about the pivot joint 24. In this manner, the hitch assembly 14 is raised, thereby raising the row units 20 above the level of the soil. Furthermore, an actuator assembly 46 is coupled to the carrier frame 22. As discussed in detail below, the actuator assembly 46 is configured to rotate the wheels 26, thereby steering the implement 10.

Figure 3:
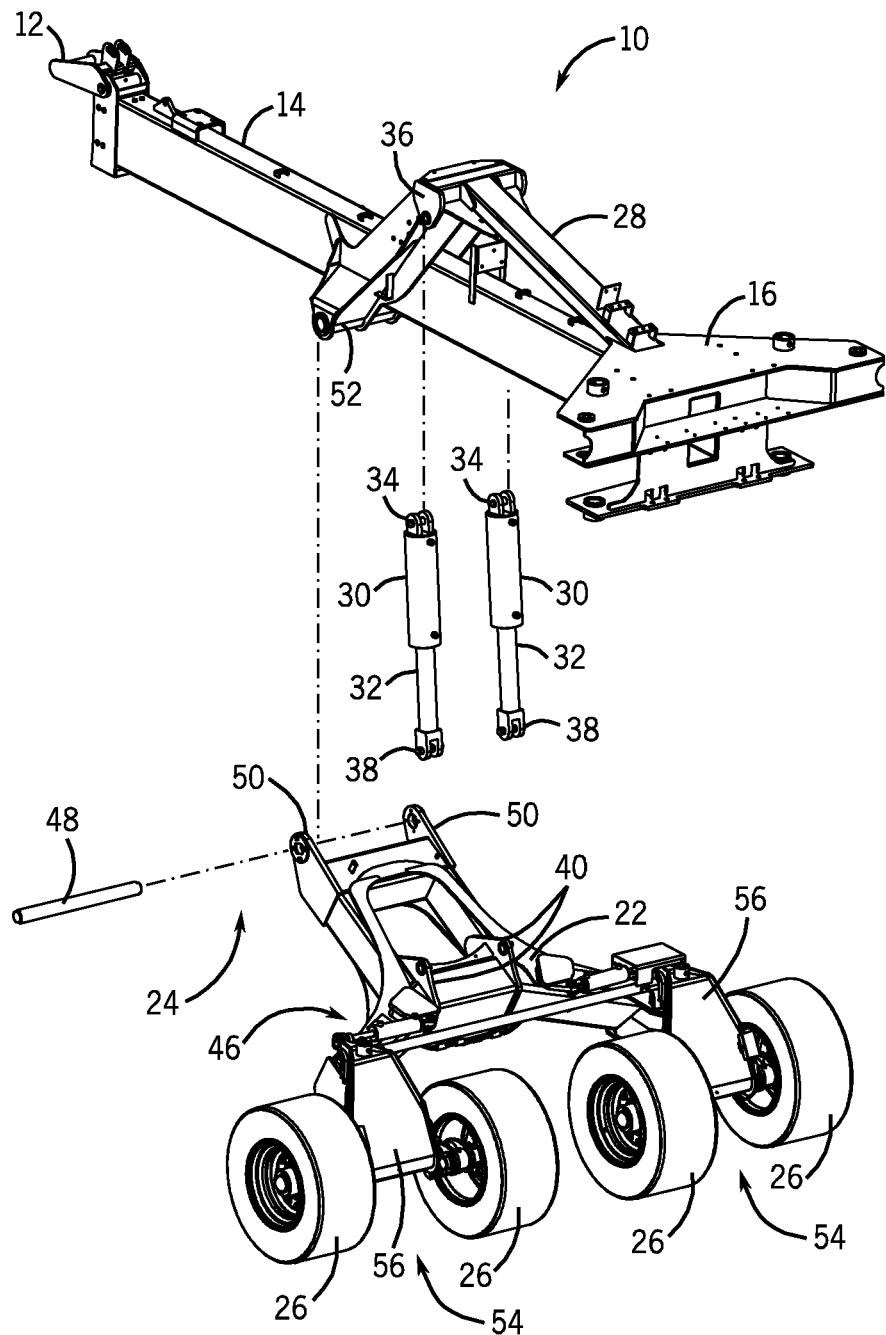
FIG. 3 is an exploded view of the agricultural implement, as shown in FIG. 1, illustrating the coupling mechanism between the carrier frame and the hitch assembly.

FIG. 3 is an exploded view of the agricultural implement 10, illustrating the coupling mechanism between the carrier frame 22 and the hitch assembly 14. As previously discussed, the carrier frame 22 is coupled to the hitch assembly 14 only by the pivot joint 24 and the main lift cylinders 30. As will be appreciated, hydraulic cylinders, such as those utilized for the main lift cylinders 30 in certain embodiments, are not configured to accept lateral loads. Consequently, the main pivot joint 24 is configured to resist substantially all lateral forces applied to the hitch assembly 14 by the carrier frame 22. In the present configuration, the main pivot joint 24 includes a pin 48 configured to pass through openings in the carrier frame 22 and the support frame 28 to pivotally couple the carrier frame 22 to the hitch assembly 14. Specifically, the carrier frame 22 includes a pair of mounting flanges 50 configured to capture a carrier mount 52 of the support frame 28. As illustrated, each mounting flange 50 includes an opening configured to align with a corresponding opening in the carrier mount 52. The pin 48 is disposed through these openings to secure the carrier frame 22 to the hitch assembly 14. As will be appreciated, contact between the mounting flanges 50 and the carrier mount 52 blocks rotation of the carrier frame 22 with respect to the hitch assembly 14. In this manner, the main pivot joint 24 serves to resist substantially all lateral forces.

As previously discussed, the main lift cylinders 30 extend between a tang 36 disposed on the mounting frame 28 and a tang 40 disposed on the carrier frame 22. In this manner, only the main pivot joint 24 and the main lift cylinders 30 serve to secure the carrier frame 22 to the hitch assembly 14. Furthermore, because the main pivot joint 24 resists substantially all lateral loads, the secondary linkage described above is obviated. Consequently, no structural elements of the carrier frame 22 or the hitch assembly are present between wheel assemblies 54. As discussed in detail below, the wheel assemblies 54 include a pair of wheels 26 rotatably mounted to a body or knuckle 56. The actuator assembly 46 is coupled to each knuckle 56 and configured to rotate the wheel assemblies 54 relative to the carrier frame 22 to steer the implement 10.

Because the carrier frame 22 is coupled to the hitch assembly 14 only by the pivot joint 24 and the main lift cylinders 30, the carrier frame 22 may be easily removed from the hitch assembly 14, thereby facilitating rapid reconfiguration of the implement 10 for various row spacings. In the present configuration, the pin 48 may be removed from the mounting flanges 50 and the carrier mount 52 to disengage the pivot joint 24. Similarly, pins coupling the first clevis 34 and the second clevis 38 of each main lift cylinder 30 to the support frame tang 36 and to the carrier frame tang 40, respectively, may be removed to uncouple the main lift cylinders 30. Once the carrier frame 22 has been removed, a carrier frame configured for a different row spacing may be attached, thereby enabling the implement 10 to accommodate various row spacings. For example, after planting one crop (e.g., soybeans) with a 20-inch row spacing, the implement 10 may be reconfigured for planting a crop (e.g., corn) with a 30-inch row spacing by interchanging the carrier frame 22. Such a configuration may reduce farming costs compared to utilizing separate implements for each row spacing.

Figure 4:
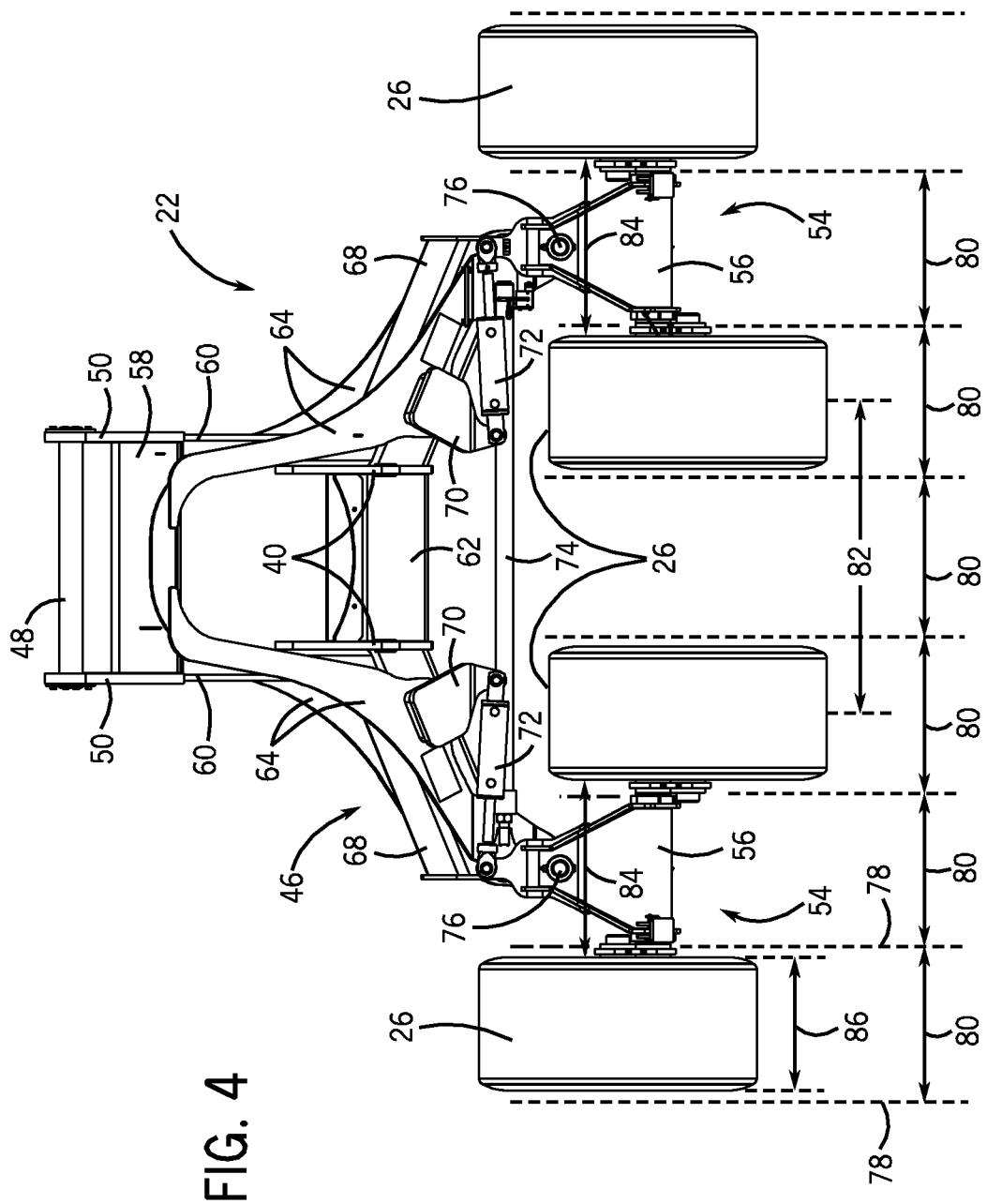
FIG. 4 is a top view of a first embodiment of the carrier frame configured to support row units with 20-inch spacing.

FIG. 4 is a top view of a first embodiment of the carrier frame configured to support row units 20 with 20-inch spacing. As previously discussed, the carrier frame 22 is configured to support the weight of the implement 10 and resist lateral loads caused by steering the implement 10. Consequently, the carrier frame 22 includes structural elements to transfer loads between the wheels 26 and the hitch assembly 14. In the present configuration, the carrier frame 22 includes a first lateral support member 58 configured to support the mounting flanges 50. A pair of longitudinal support members 60 extend from the first lateral support member 58 to a second lateral support member 62, forming a box structure. In the present embodiment, each support member 58, 60 and 62 is hollow and has a rectangular cross section. As will be appreciated, other support member profiles, as well as other structural arrangements, may be employed in alternative embodiments. Furthermore, plates 64 are coupled to each of the support members 58, 60 and 62 to provide additional structural rigidity (e.g., torsional stiffness). The carrier frame 22 also includes lateral extensions 68 configured to couple the box structure to the wheel assemblies 54. As discussed in detail below, the length of the lateral extensions 68 may vary to adjust the distance between wheel assemblies 54 for various row spacings.

As illustrated, the carrier frame 22 includes a pair of mounting brackets 70 configured to support hydraulic cylinders 72. In the present embodiment, the actuator assembly 46 includes the hydraulic cylinders 72 and a tie rod 74. As discussed in detail below, the combination of the hydraulic cylinders 72 and tie rod 74 may facilitate equalized steering effort for turning the implement in both the left and right directions. As illustrated, each hydraulic cylinder 72 extends between the carrier frame 22 and a respective wheel assembly 54, and the tie rod 74 extends between the wheel assemblies 54. The hydraulic cylinders 72 are configured to rotate each wheel assembly 54 about a knuckle pivot joint 76, while the tie rod 74 is configured to ensure that the wheel assemblies 54 rotate together by transferring torque between assemblies 54.

For example, a left turn may be initiated by extending a piston rod of the hydraulic cylinder 72 positioned on the right side of the carrier frame 22, thereby inducing the right wheel assembly 54 to rotate in a clockwise direction about the right pivot joint 76. At the same time, a piston rod of the hydraulic cylinder 72 positioned on the left side of the carrier frame 22 is retracted causing the left wheel assembly 54 to rotate in a clockwise direction. As will be appreciated, because piston rods of typical hydraulic cylinders extend with greater force than they retract owing to the differential area of the piston exposed to pressurized fluid, in prior art arrangements, different forces and moments may be exerted on wheel assemblies. Similarly, owing to the different internal volumes on the cap and rod ends of the cylinders, the steering system may rotate faster in one direction than the other for the same volumetric flow rate of hydraulic fluid. However, in the present configuration, the tie rod 74 serves to transfer the additional force applied by the right hydraulic cylinder 72 to the left wheel assembly 54. Consequently, a substantially equal torque will be applied to both wheel assemblies 54, thereby inducing both wheel assemblies 54 to rotate together. In other words, during a turn, the angle of the right wheel assembly 54 and the angle of the left wheel assembly 54 relative to the carrier frame 22 will be substantially equal. Similarly, during a right turn, the additional force applied by the left hydraulic cylinder 72 will be transferred through the tie rod 74 to the right wheel assembly 54, thereby transferring torque to the right wheel assembly 54. Therefore, the present embodiment may enable the implement 10 to turn in both the left and right directions at a substantially equal rate and with substantially equal force.

The present carrier frame 22 is configured to accommodate a row spacing of approximately 20 inches. As illustrated, seed rows 78 are spaced a distance 80 apart to provide crops with sufficient soil area for proper development. As will be appreciated, certain crops may utilize a greater soil area than others. For example, in the illustrated embodiment, the distance 80 between rows 78 is approximately 20 inches. To accommodate a 20-inch row spacing, the present carrier frame 22 is configured to establish a wheel-to-wheel spacing 82 of approximately 40 inches, such as by adjusting the length of the lateral extensions 68. As will be appreciated, positioning the wheels 26 between rows 78 may reduce soil compaction, thereby facilitating seed deposition by the row units 20. Consequently, the wheel-to-wheel spacing 82 and the spacing 84 between wheels 26 of each wheel assembly 54 are configured to position the wheels 26 such that they do not directly engage the soil along each row 78. In the present configuration, a width 86 of each wheel 26 is approximately 19 inches. Therefore, the present carrier frame 22 is configured to precisely position the 19-inch wide wheels 26 between the 20-inch wide rows 78. As will be appreciated, alternative embodiments may include wheels 26 having larger or smaller widths 86.

Furthermore, because the secondary linkage has been obviated by the structural integrity of the main pivot joint 24, no structural elements of the carrier frame 22 or the hitch assembly 14 are disposed between the wheel assemblies 54. Consequently, the inner wheel 26 of each wheel assembly 54 may be positioned farther laterally inwardly than configurations including the secondary linkage. Moreover, the additional space between wheel assemblies 54 facilitates the use of wider wheels, such as the illustrated 19-inch wide wheels 26, thereby enabling the carrier frame 22 to support heavier loads.

Figure 5:
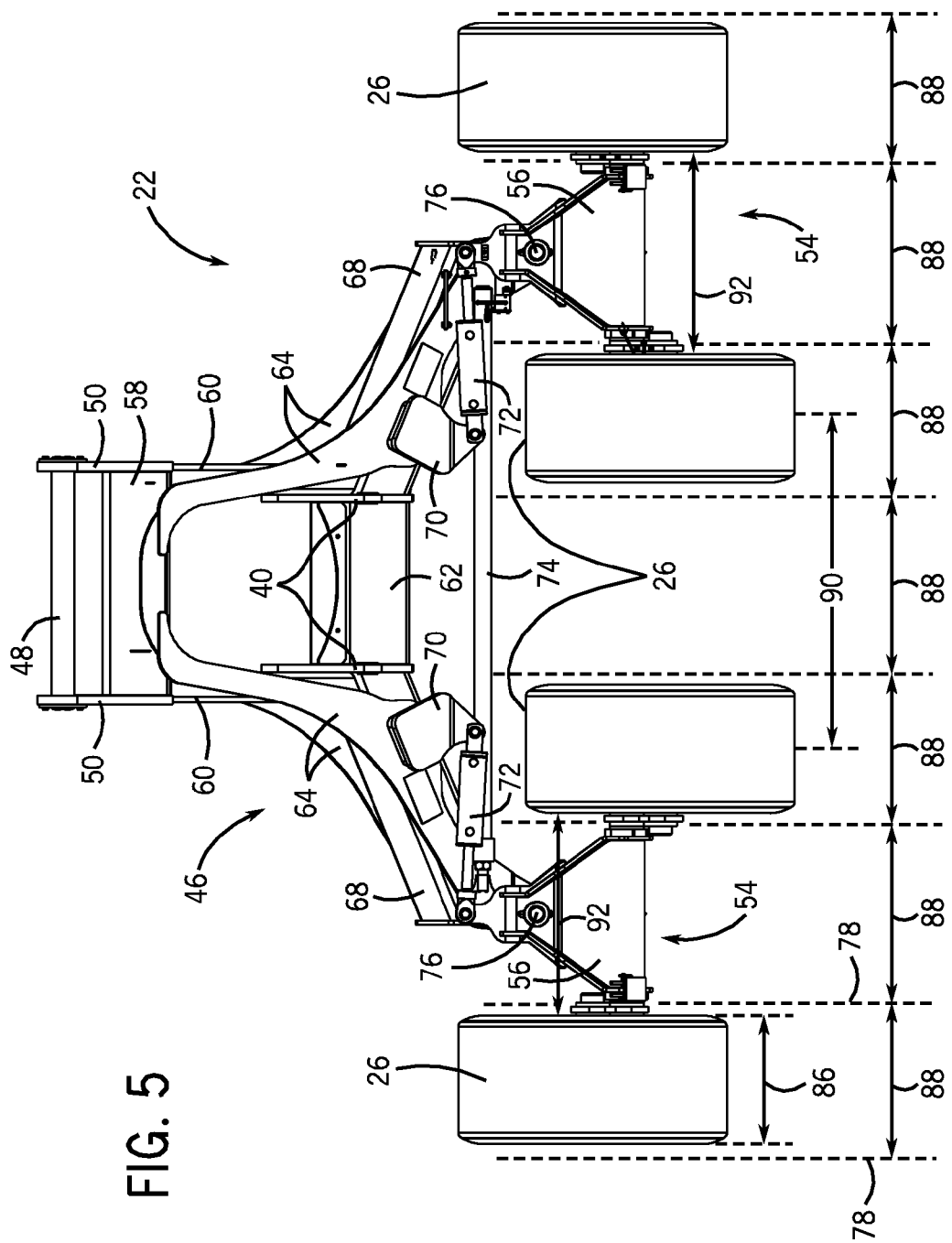
FIG. 5 is a top view of a second embodiment of the carrier frame configured to support row units with 22-inch spacing.

FIG. 5 is a top view of a second embodiment of the carrier frame 22 configured to support row units 20 with 22-inch spacing. As illustrated, seed rows 78 are spaced a distance 88 apart to provide crops with sufficient soil area for proper development. As previously discussed, certain crops may utilize a greater soil area than others. For example, in the illustrated embodiment, the distance 88 between rows 78 is approximately 22 inches. To accommodate a 22-inch row spacing, the present carrier frame 22 is configured to establish a wheel-to-wheel spacing 90 of approximately 44 inches, such as by adjusting the length of the lateral extensions 68. As will be appreciated, positioning the wheels 26 between rows 78 may reduce soil compaction, thereby facilitating seed deposition by the row units 20. Consequently, the wheel-to-wheel spacing 90 and the spacing 92 between wheels 26 of each wheel assembly 54 are configured to position the wheels 26 such that they do not directly engage the soil along each row 78.

Figure 6:
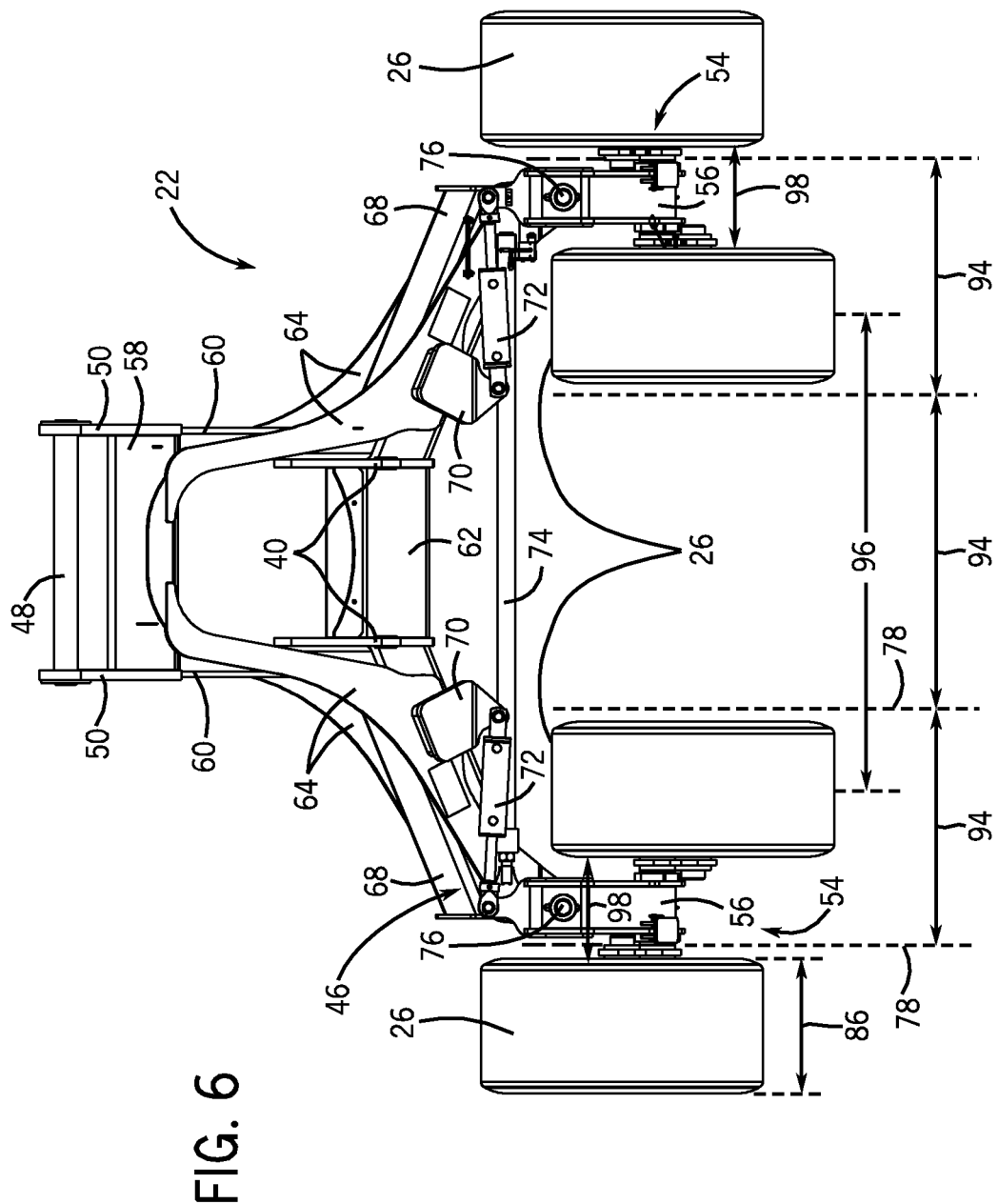
FIG. 6 is a top view of a third embodiment of the carrier frame configured to support row units with 30-inch spacing.

FIG. 6 is a top view of a third embodiment of the carrier frame 22 configured to support row units 20 with 30-inch spacing. As illustrated, seed rows 78 are spaced a distance 94 apart to provide crops with sufficient soil area for proper development. As previously discussed, certain crops may utilize a greater soil area than others. For example, in the illustrated embodiment, the distance 94 between rows 78 is approximately 30 inches. To accommodate a 30-inch row spacing, the present carrier frame 22 is configured to establish a wheel-to-wheel spacing 96 of approximately 60 inches, such as by adjusting the length of the lateral extensions 68. As will be appreciated, positioning the wheels 26 between rows 78 may reduce soil compaction, thereby facilitating seed deposition by the row units 20. Consequently, the wheel-to-wheel spacing 96 and the spacing 98 between wheels 26 of each wheel assembly 54 are configured to position the wheels 26 such that they do not directly engage the soil along each row 78.

In addition, each carrier frame 22 may include structural differences based on the anticipated load. For example, the carrier frame 22 with 20-inch row spacing may be configured to support a greater load than the carrier frame 22 with 30-inch row spacing. In certain embodiments, the tool bars 18 configured to support row units 20 with 30-inch row spacing are longer than tool bars 18 having row units 20 with 20-inch row spacing. Consequently, the longer tool bars 18 may include additional wheel assemblies for supporting the extended structure. As will be appreciated, the additional wheel assemblies may reduce the load on the carrier frame 22. Therefore, carrier frames 22 configured to support the tool bars 18 with row units 20 positioned for 20-inch row spacing may include additional structural elements to compensate for the additional load.

Figure 7:
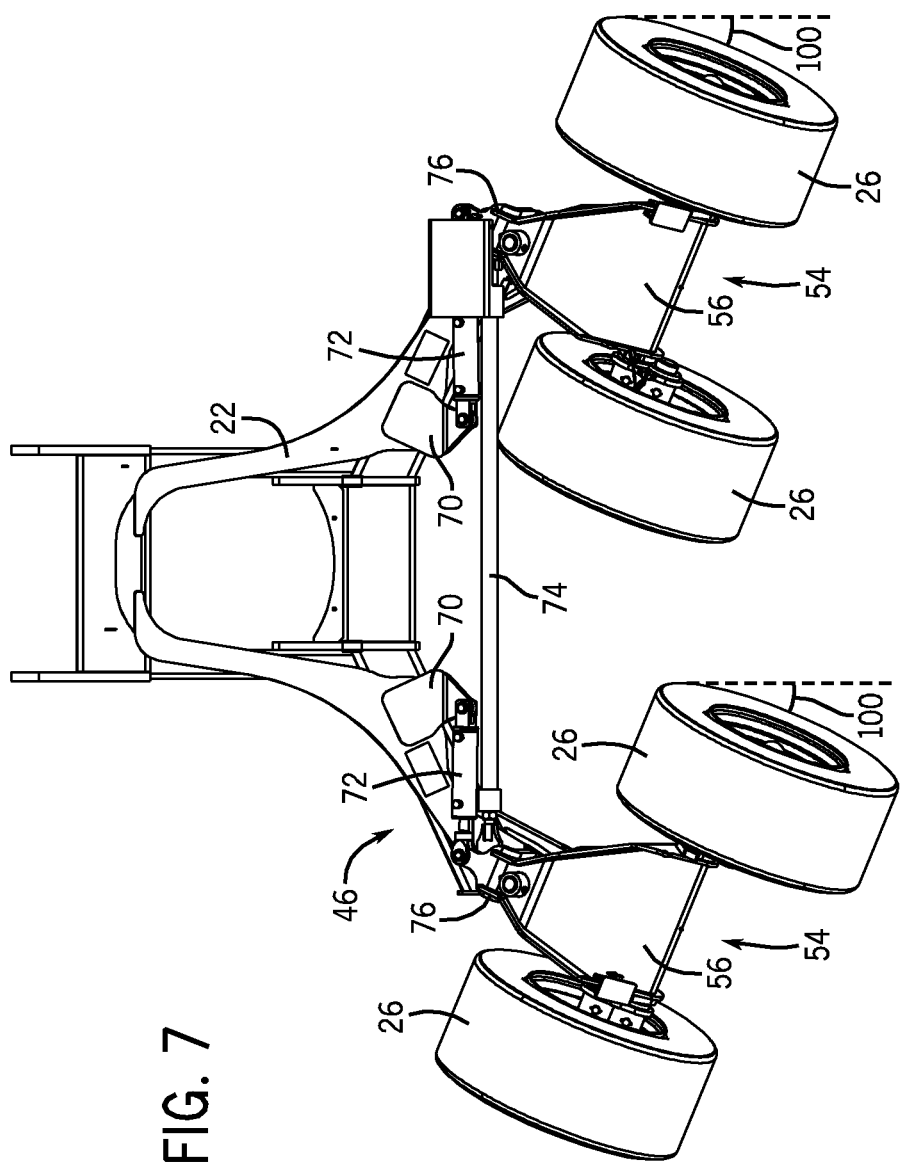
FIG. 7 is a top view of the second embodiment of the carrier frame in which the wheel assemblies are oriented to steer the agricultural implement in a left turn.

FIG. 7 is a top view of the second embodiment of the carrier frame 22 in which the wheel assemblies 54 are oriented to steer the agricultural implement 10 in a left turn. As illustrated, the wheel assemblies 54 are oriented at an angle 100 relative to the carrier frame 22. In the illustrated embodiment, the angle is approximately 25 degrees. In certain embodiments, the wheel assemblies 54 may be capable of rotating between approximately 30 degrees to the left and approximately 30 degrees to the right. In this manner, the actuator assembly 46 may steer the implement 10 to a desired orientation based on user input or automatically based on a degree of rotation of the tow vehicle. As illustrated, because the wheel assemblies 54 are linked by the tie rod 74, the rotation angle 100 of each wheel assembly 54 relative to the carrier frame 22 is substantially equal.

FIG. 8 is a top view of a wheel assembly 54, illustrating a wheel rocking mechanism. As illustrated, the wheel assembly 54 includes a main axle 102 rotatably coupled to the body or knuckle 56 of the wheel assembly 54. A linkage 104 is rigidly coupled to each end of the main axle 102. Each linkage 104 couples a secondary axle 106 to the main axle 102. The secondary axles 106 are configured to support the wheels 26. As illustrated, the secondary axles 106 are offset from the main axle 102, with each axle 106 being displaced in an opposite longitudinal direction. Consequently, when one wheel 26 encounters a variation in soil elevation (e.g., trench, bump, etc.), the other wheel 26 may maintain contact with the soil. For example, if the right wheel 26 encounters a bump, the right secondary axle 106 will rotate in the direction 108. Because the right secondary axle 106 is rigidly coupled to the main axle 102 by the linkage 104, rotation of the right secondary axle 106 causes the main axle 102 to rotate. Consequently, coupling between the main axle 102 and the left secondary axle 106 causes the left secondary axle 106 to rotate in the direction 110. This configuration enables the left wheel 26 to maintain contact with the soil even if the right wheel 26 encounters a variation in soil elevation. Similarly, if the left wheel 26 experiences a change in elevation, the wheel rocking assembly may enable the right wheel 26 to maintain contact with the soil. As a result, variations in the soil engagement depth of the row units 20 may be substantially reduced or eliminated despite variations in soil elevation.

Furthermore, the wheel rocking mechanism may enable the implement 10 to maintain substantially constant wheel weight distribution during turns. As will be appreciated, the orientation of the implement 10 may drift with respect to a tow vehicle during operation. Consequently, the present actuator assembly 46 may vary the orientation of the wheel assemblies 54 to adjust the path of the implement 10 such that the row units 20 form substantially parallel rows. As the orientation of the wheel assemblies 54 varies, the rocking mechanism may ensure that the penetration depth of the row units 20 remains substantially constant. As a result, the wheel assemblies 54 may be steered while the implement 10 is in the working position, as well as the transport position.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
   a hitch assembly configured to couple the agricultural implement to a tow vehicle;
   a carrier frame pivotally coupled to the hitch assembly;
   a main pivot joint configured to pivotally couple the carrier frame to the hitch assembly, wherein the main pivot joint is configured to resist substantially all lateral loads between the carrier frame and the hitch assembly;
   a pair of wheel assemblies each rotatably coupled to the carrier frame by a respective pivot joint, wherein each wheel assembly is positioned laterally outward from the hitch assembly, and wherein no structural element of the carrier frame or the hitch assembly is positioned between the pair of wheel assemblies; and
   an actuator assembly configured to rotate each wheel assembly about the respective pivot joint.

2. The agricultural implement of claim 1, wherein the carrier frame is interchangeable to accommodate various row spacings such that ground engaging wheels are positioned between seed rows.

3. The agricultural implement of claim 1, wherein each wheel assembly comprises a wheel rocking mechanism configured to vary a first vertical position of a first wheel in a direction substantially opposite from a second vertical position of a second wheel.

4. The agricultural implement of claim 3, wherein each wheel rocking mechanism comprises:
   a main axle rotatably coupled to a knuckle;
   a first secondary axle configured to support the first wheel, and coupled to a first end of the main axle by a first linkage; and
   a second secondary axle configured to support the second wheel, and coupled to a second end of the main axle by a second linkage, wherein the first linkage and the second linkage offset the first and second secondary axles in opposite longitudinal directions such that rotation of the first secondary axle about the main axle induces rotation of the second secondary axle about the main axle.

5. The agricultural implement of claim 1, wherein the main pivot joint comprises a pin disposed through mounting flanges on the carrier frame and a carrier mount coupled to the hitch assembly.

6. The agricultural implement of claim 1, comprising a pair of main lift cylinders each extending between the hitch assembly and the carrier frame, and each configured to selectively lower the hitch assembly into a working position and raise the hitch assembly into a transport position, wherein the carrier frame is coupled to the hitch assembly only by the main pivot joint and the pair of main lift cylinders.

7. An agricultural implement, comprising:
   a hitch assembly configured to couple the agricultural implement to a tow vehicle;
   a carrier frame pivotally coupled to the hitch assembly by a single main pivot joint, wherein the main pivot joint is configured to resist substantially all lateral loads between the carrier frame and the hitch assembly;
   a pair of wheel assemblies each rotatably coupled to the carrier frame by a respective knuckle pivot joint, wherein each wheel assembly is positioned laterally outward from the hitch assembly; and
   an actuator assembly configured to rotate each wheel assembly about the respective knuckle pivot joint while the agricultural implement is in both a working and transport position.

8. The agricultural implement of claim 7, wherein the main pivot joint comprises a pin disposed through mounting flanges on the carrier frame and a carrier mount coupled to the hitch assembly.

9. The agricultural implement of claim 7, wherein the carrier frame is interchangeable to accommodate various row spacings.

10. The agricultural implement of claim 7, wherein no structural element of the carrier frame or the hitch assembly is positioned between the pair of wheel assemblies.

11. The agricultural implement of claim 7, wherein each wheel assembly comprises a wheel rocking mechanism configured to vary a first vertical position of a first wheel in a direction substantially opposite from a second vertical position of a second wheel.

12. The agricultural implement of claim 7, comprising a pair of main lift cylinders each extending between the hitch assembly and the carrier frame, and each configured to selectively lower the hitch assembly into the working position and raise the hitch assembly into the transport position.

13. The agricultural implement of claim 12, wherein the carrier frame is coupled to the hitch assembly only by the main pivot joint and the pair of main lift cylinders.

14. An agricultural implement, comprising:
a hitch assembly configured to couple the agricultural implement to a tow vehicle;
a carrier frame pivotally coupled to the hitch assembly by a main pivot joint;
a pair of main lift cylinders each extending between the hitch assembly and the carrier frame, and each configured to selectively lower the hitch assembly into a working position and raise the hitch assembly into a transport position, wherein the carrier frame is coupled to the hitch assembly only by the main pivot joint and the pair of main lift cylinders, and wherein the carrier frame is interchangeable to accommodate various row spacings;
a pair of wheel assemblies each rotatably coupled to the carrier frame by a respective knuckle pivot joint, wherein each wheel assembly is positioned laterally outward from the hitch assembly; and
an actuator assembly configured to rotate each wheel assembly about the respective knuckle pivot joint.

15. The agricultural implement of claim 14, wherein each wheel assembly comprises a wheel rocking mechanism configured to vary a first vertical position of a first wheel in a direction substantially opposite from a second vertical position of a second wheel.

16. The agricultural implement of claim 14, wherein the main pivot joint comprises a pin disposed through mounting flanges on the carrier frame and a carrier mount coupled to the hitch assembly.

17. The agricultural implement of claim 14, wherein the various row spacings comprise at least 20-inch, 22-inch and 30-inch row spacings.

18. The agricultural implement of claim 14, wherein the main pivot joint is configured to resist substantially all lateral loads between the carrier frame and the hitch assembly.

19. The agricultural implement of claim 14, wherein no structural element of the carrier frame or the hitch assembly is positioned between the pair of wheel assemblies.

* * * * *